Patented Mar. 1, 1927.

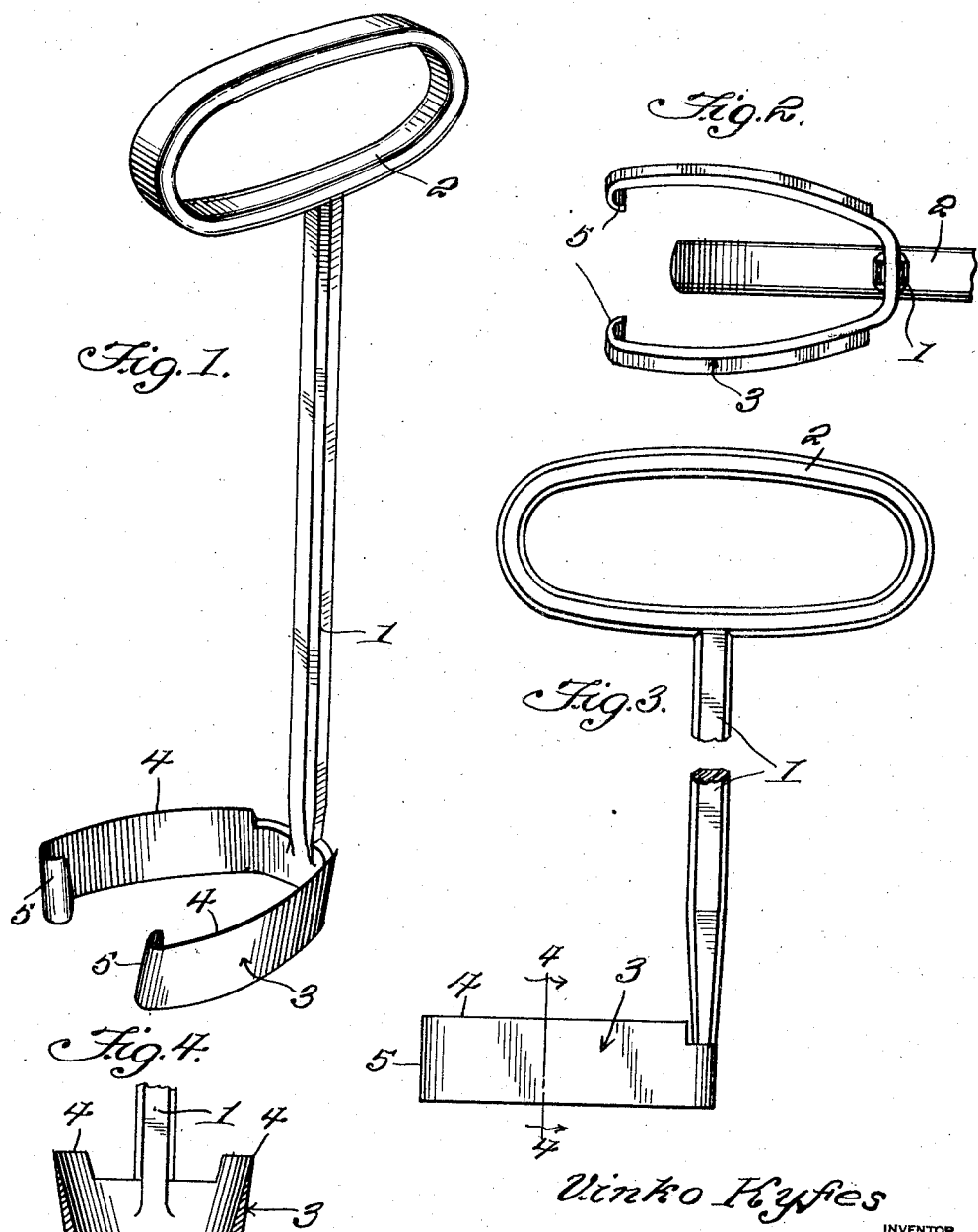

1,619,619

UNITED STATES PATENT OFFICE.

VINKO KYFES, OF ST. JOSEPH, LOUISIANA.

FARRIER'S KNIFE.

Application filed July 27, 1925. Serial No. 46,441.

This invention relates to a cutting tool used by horseshoers, the general object of the invention being to provide a knife which will facilitate the fitting of a shoe to a horse's hoof.

This invention also consists in certain other features of construction and in the combination and arrangement of the several parts, to be hereinafter fully described, illustrated in the accompanying drawings, and specifically pointed out in the appended claim.

In describing my invention in detail, reference will be had to the accompanying drawings wherein like characters denote like or corresponding parts throughout the several views, and in which:—

Fig. 1 is a perspective view of the device,
Fig. 2 is a bottom plan view thereof,
Fig. 3 is a side view, and
Fig. 4 is a section on line 4—4 of Fig. 3.

In these views, 1 indicates the stem of the device which is provided with a loop 2 at one end which forms a handle, and a U-shaped member 3 is connected with the other end, this member being connected with the stem at its bight. The limbs of this member are each wedge-shaped in cross-section to provide a cutting edge arranged in the upper or inner part of the member, as shown at 4, which extends from a point spaced a slight distance from the stem to the extremity of the limb and this extremity is curved to form a hook 5. It will be noted from the showing in Fig. 4 that the limbs of the U-shaped member incline upwardly and outwardly toward the cutting edge.

Thus I have provided a tool which can be used in paring down a horse's hoof to fit a shoe thereto, the hooks being used to cut out corns and the like in the hoof.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A farrier's knife comprising a stem, a handle on one end of the stem, a U-shaped member having its bight connected with the other end of the stem, the limbs of said member being of wedge-shape in cross-section to form cutting edges which are arranged at the inner part of the member, said limbs inclining upwardly and outwardly, and the extremities of the limbs being curved inwardly to form hooks which are of the same cross-sectional shape as the limbs.

In testimony whereof I affix my signature.

VINKO KYFES.